(12) United States Patent
Nishikibe et al.

(10) Patent No.: US 9,868,340 B2
(45) Date of Patent: Jan. 16, 2018

(54) CONTROL DEVICE FOR VEHICLE OPENING/CLOSING BODY

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi (JP)

(72) Inventors: Takeshi Nishikibe, Tokai (JP); Ryo Asano, Owariasahi (JP); Yoshinori Hitomi, Okazaki (JP)

(73) Assignees: AISIN SEIKI KABUSHIKI KAISHA, Kariya-Shi, Aichi-Ken (JP); TOYOTA JIDOSHA KABUSHIKI KAISHA, Toyoto-Shi, Aichi-Ken (JP)

( * ) Notice: Subject to any disclaimer, the term of this patent is extended or adjusted under 35 U.S.C. 154(b) by 0 days.

(21) Appl. No.: 14/975,290

(22) Filed: Dec. 18, 2015

(65) Prior Publication Data
US 2016/0177609 A1 Jun. 23, 2016

(30) Foreign Application Priority Data
Dec. 18, 2014 (JP) .................................. 2014-255714

(51) Int. Cl.
*B60J 5/10* (2006.01)
*E05F 1/00* (2006.01)
(Continued)

(52) U.S. Cl.
CPC .............. *B60J 5/101* (2013.01); *E05F 1/002* (2013.01); *E05F 15/40* (2015.01); *E05F 15/75* (2015.01);
(Continued)

(58) Field of Classification Search
CPC ........................... B60J 5/101; E05Y 2900/532
(Continued)

(56) References Cited

U.S. PATENT DOCUMENTS

| 4,563,625 A * | 1/1986 | Kornbrekke .......... B66B 13/143 |
| | | 318/283 |
| 4,952,080 A * | 8/1990 | Boiucaner ............ G05B 19/232 |
| | | 318/602 |

(Continued)

FOREIGN PATENT DOCUMENTS

| JP | 2001-277853 A | 10/2001 |
| JP | 2005-146683 A | 6/2005 |

(Continued)

OTHER PUBLICATIONS

The extended European Search Report dated May 27, 2016, by the European Patent Office in corresponding European Patent Application No. 15200228.3-1607. (7 pages).

(Continued)

*Primary Examiner* — Gregory Strimbu
(74) *Attorney, Agent, or Firm* — Buchanan, Ingersoll & Rooney PC

(57) ABSTRACT

A control device for a vehicle closure body includes an electronic control unit configured to measure a position of the body, measure a speed of the body, determine an opening or closing direction in which the body is operated by a user, and move the body in the determined opening or closing direction with use of a drive unit when the speed of the body measured at the measured position of the body is equal to or higher than a speed threshold at the measured position of the body.

13 Claims, 11 Drawing Sheets

(51) Int. Cl.
*E05F 15/40* (2015.01)
*E05F 15/75* (2015.01)
*E05F 15/622* (2015.01)

(52) U.S. Cl.
CPC ......... *E05F 15/622* (2015.01); *E05Y 2400/40* (2013.01); *E05Y 2800/11* (2013.01); *E05Y 2900/50* (2013.01)

(58) Field of Classification Search
USPC .................................................. 49/139, 140
See application file for complete search history.

(56) References Cited

U.S. PATENT DOCUMENTS

| | | | | |
|---|---|---|---|---|
| 5,434,487 A | * | 7/1995 | Long ....................... | E05F 15/75 318/280 |
| 5,801,502 A | * | 9/1998 | Monzen ................ | E05F 15/632 318/266 |
| 5,851,050 A | * | 12/1998 | Squire ..................... | E05F 15/49 296/146.4 |
| 5,982,126 A | | 11/1999 | Hellinga et al. | |
| 5,986,420 A | * | 11/1999 | Kato ...................... | E05F 15/619 318/1 |
| 6,580,243 B2 | * | 6/2003 | Itami ...................... | G05B 19/40 318/280 |
| 7,406,377 B2 | * | 7/2008 | Shiga .................... | E05F 15/646 318/282 |
| 7,617,034 B2 | | 11/2009 | Suzuki | |
| 7,937,893 B2 | * | 5/2011 | Pribisic .................. | E05F 15/70 296/1.02 |
| 2003/0050151 A1 | | 3/2003 | Fukumura et al. | |

FOREIGN PATENT DOCUMENTS

| | | |
|---|---|---|
| JP | 2006-9526 A | 1/2006 |
| JP | 2007-530822 A | 11/2007 |
| JP | 2011026941 A | 2/2011 |

OTHER PUBLICATIONS

Office Action (Notice of Reasons for Refusal) dated Nov. 29, 2016, by the Japanese Patent Office in Japanese Patent Application No. 2014-255714, and an English Translation of the Office Action. (6 pages).

* cited by examiner

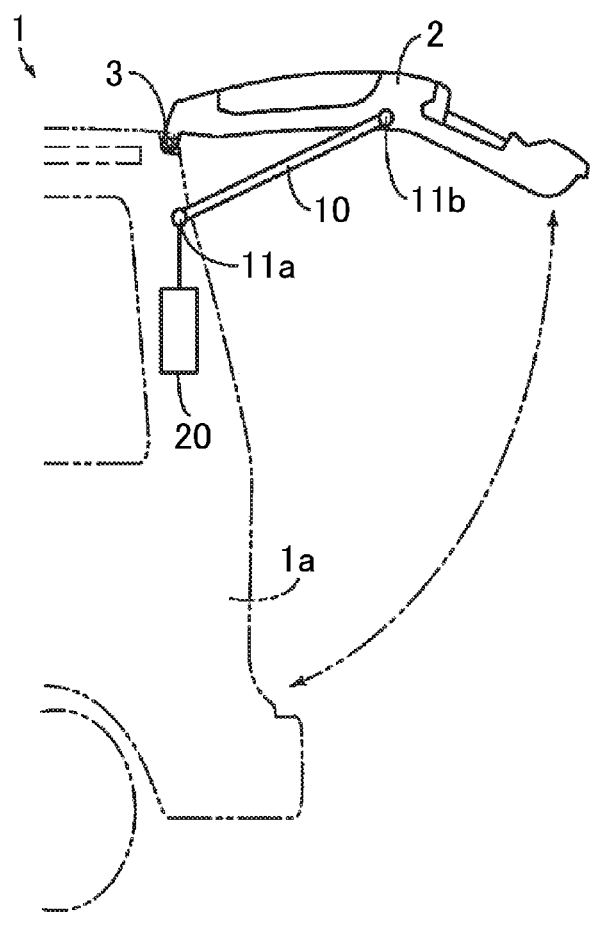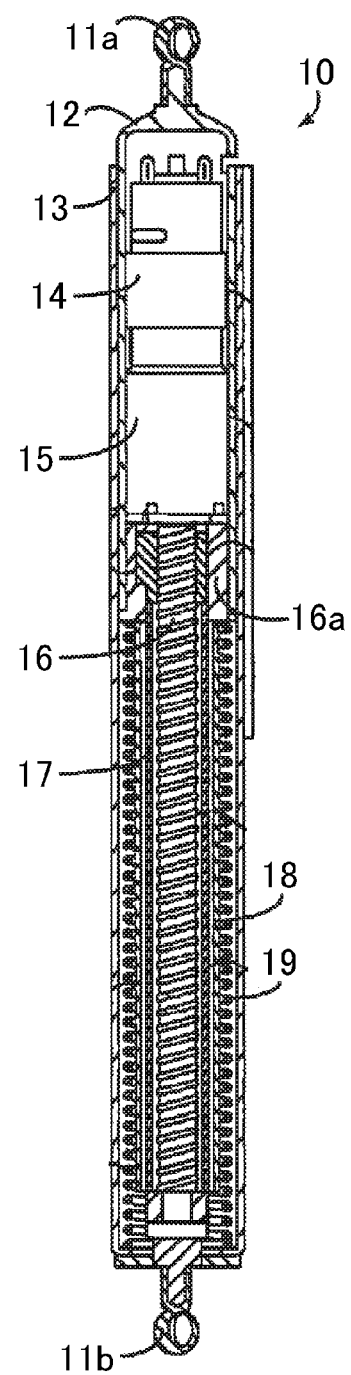
FIG. 1A
FIG. 1B

CONTROL DEVICE FOR VEHICLE OPENING/CLOSING BODY

INCORPORATION BY REFERENCE

The disclosure of Japanese Patent Application No. 2014-255714 filed on Dec. 18, 2014 including the specification, drawings and abstract is incorporated herein by reference in its entirety.

BACKGROUND OF THE INVENTION

1. Field of the Invention

The invention relates to a control technology for assisting an opening/closing action for a vehicle opening/closing body performed by a user.

2. Description of Related Art

There has been conventionally known a technology in which while a user manually performs an opening/closing action for an opening/closing body of a vehicle, the opening/closing body is electrically caused to perform an opening/closing operation to assist the opening/closing action performed by the user. Published Japanese Translation of PCT application No. 2007-530822 (JP 2007-530822 A) describes a technology in which a function of assisting the opening/closing action of the user is activated to electrically cause the opening/closing body to perform the opening/closing operation when the user has performed the opening/closing action for the opening/closing body to move the opening/closing body to a prescribed position.

In the technology described in JP 2007-530822 A, since the movement of the vehicle opening/closing body to the prescribed position is used as a trigger for the activation of the assist function, when the opening/closing body has moved to the prescribed position irrespective of the intention of the user, the opening/closing body may malfunction (erroneously function) automatically.

SUMMARY OF THE INVENTION

The invention provides a control device for a vehicle opening/closing body, which implements an assist function for an opening/closing action for the vehicle opening/closing body.

An aspect of the invention relates to a control device for a vehicle opening/closing body. The control device includes an electronic control unit configured to measure a position of an opening/closing body of a vehicle, measure a speed of the opening/closing body, determine an opening/closing direction in which the opening/closing body is operated, and operate the opening/closing body in the determined opening/closing direction with use of a drive unit when the speed of the opening/closing body measured at the measured position of the opening/closing body is equal to or higher than a speed threshold at the measured position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A is a schematic configuration diagram of an opening/closing body and a drive unit according to a first embodiment;

FIG. 1B is a schematic configuration diagram of the drive unit according to the first embodiment;

DETAILED DESCRIPTION OF EMBODIMENTS

Figure 2:
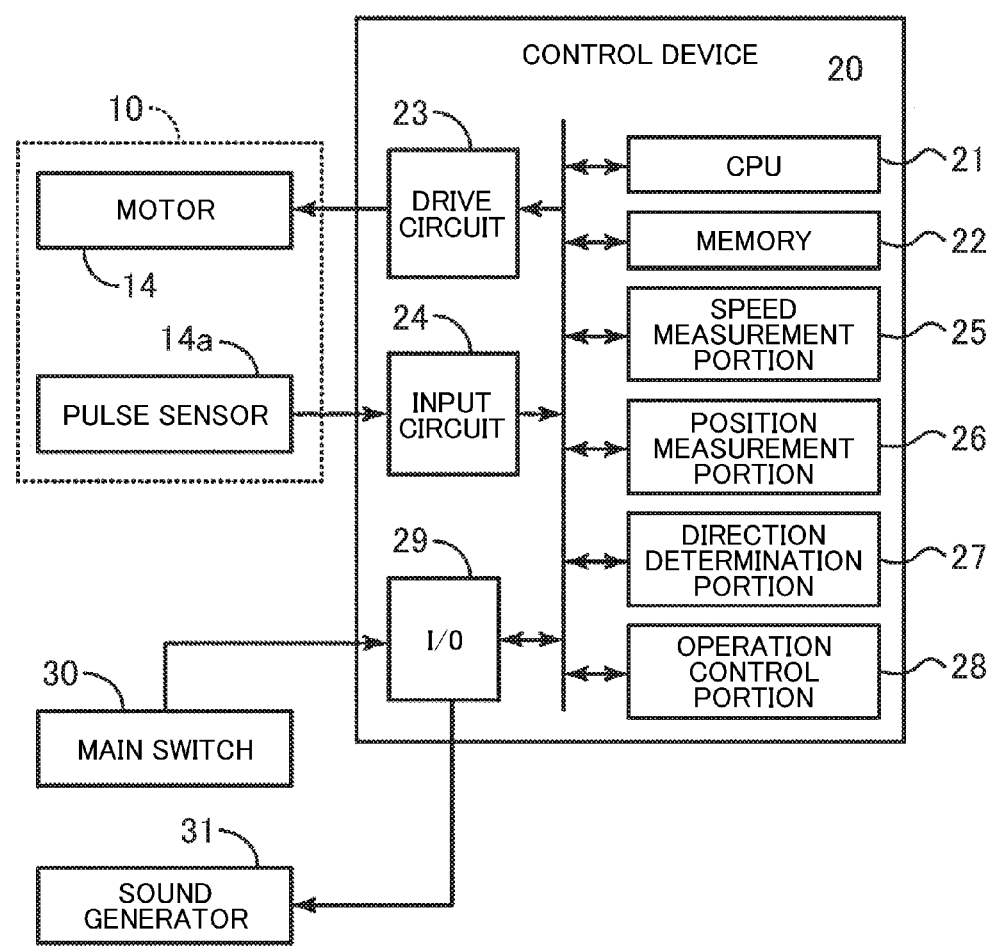
FIG. 2 is a block diagram of a control device and the like according to the first embodiment.

FIGS. 1A and 1B are schematic configuration diagrams of an opening/closing body 2, a drive unit 10, and the like according to a first embodiment of the invention. As shown in FIG. 1A, the opening/closing body 2 is mounted to a rear portion of a vehicle body 1a of a vehicle 1 via a hinge 3, and moves between a fully closed position at which the opening/closing body 2 is completely closed and a fully opened position at which the opening/closing body 2 is completely opened.

The drive unit 10 is a damper-type drive unit having one joint 11a coupled to the vehicle body 1a and the other joint 11b coupled to the opening/closing body 2, and electrically causes the opening/closing body 2 to perform an opening/closing operation (an opening operation or a closing operation) in accordance with control performed by a control device 20.

As shown in FIG. 1B, in the drive unit 10, a cylindrical housing tube 12 having the joint 11a is accommodated in a cylindrical cover tube 13 so as to be able to reciprocate linearly in an axial direction. A motor 14 as a drive source is accommodated in the housing tube 12, and an output of the motor 14 is transmitted to a bar-shaped screw spindle 16 via a reduction mechanism 15. The screw spindle 16 is inserted into a spindle tube 17 through a spindle nut 16a so as to be rotatable relative to the spindle tube 17, and one end of the spindle tube 17 is fixed to the spindle nut 16a and the other end thereof is fixed to the joint 11b. The cover tube 13 accommodates a cylindrical guide tube 18 in an internal portion thereof, and the guide tube 18 accommodates the screw spindle 16, the spindle nut 16a, and the spindle tube 17. A compression coil spring 19 that holds the opening/closing body 2 at any position is mounted to the outer periphery of the guide tube 18, and the compression coil spring 19 generates a reaction force equal to or larger than the weight of the opening/closing body 2.

When the motor 14 rotates in accordance with the control performed by the control device 20, the rotation of the motor 14 causes the screw spindle 16 to rotate, and the rotation is converted to a linear motion of the spindle nut 16a by the screw spindle 16 and the spindle nut 16a, and the spindle nut 16a and the spindle tube 17 move linearly. Thus, the cover tube 13 moves relative to the housing tube 12, the movement acts on the opening/closing body 2 through the joints 11a and 11b, and the opening/closing body 2 is caused to perform the opening/closing operation (i.e., the opening/closing body 2 is opened/closed).

Note that the opening/closing body 2 performs the opening operation with a forward rotation of the motor 14, and performs the closing operation with a reverse rotation of the motor 14, although the present invention is not limited to this configuration. Accordingly, when the motor 14 rotates in the forward direction in accordance with the control performed by the control device 20, the cover tube 13 moves linearly in a direction away from the housing tube 12, and the opening/closing body 2 performs the open operation. On the other hand, when the motor 14 rotates in the reverse direction in accordance with the control performed by the control device 20, the cover tube 13 moves linearly in a direction toward the housing tube 12, and the opening/closing body 2 performs the closing operation.

FIG. 2 is a block diagram of the control device 20 for the vehicle opening/closing body. The control device 20 is an electronic control unit (ECU) that controls the opening/closing operation of the opening/closing body 2, and includes a central processing unit (CPU) 21, a memory 22, a drive circuit 23 for the motor 14, an input circuit 24 for a pulse sensor 14a, and an input/output circuit (I/O) 29. The memory 22 has functions as a read only memory (ROM) that stores various control programs and a random access memory (RAM) that temporarily stores various data. The memory 22 stores a speed threshold map and a movement amount threshold map described later. To the CPU 21, the drive circuit 23, and the like, a power supply voltage is supplied from a battery of the vehicle 1 via a power supply circuit (not shown).

The CPU 21 is connected to the pulse sensor 14a via the input circuit 24, and receives a pulse signal from the pulse sensor 14a. The pulse sensor 14a includes paired hall elements that detect the magnetic field of a magnet rotor attached to a shaft of the motor 14, and the pulse sensor 14a sends the pulse signals having different phases at each rotation of a prescribed angle of the motor 14, to the CPU 21.

The control device 20 includes a speed measurement portion 25, a position measurement portion 26, and a direction determination portion 27 as functional portions that are implemented by the CPU 21 based on a prescribed program stored in the memory 22. The speed measurement portion 25 measures a rotational speed of the motor 14 based on a time interval of a rising (or falling) edge of one of the pulse signals, and measures a speed related to opening and closing of the opening/closing body 2 based on the rotational speed. The position measurement portion 26 detects a rotation angle of the motor 14 by counting the edges of the pulse signal, and measures the position of the opening/closing body 2 based on the rotation angle. The direction determination portion 27 determines a rotational direction of the motor 14 based on a difference in phase between the pulse signals, and determines an opening/closing direction of the opening/closing body 2 (i.e., determines whether the opening/closing body 2 moves in an opening direction or a closing direction) based on the rotational direction. Note than the position of the opening/closing body 2 may be represented by using the angle of the opening/closing body 2 with respect to a prescribed axis (e.g., a vertical axis), or may also be represented by using the length of an arc drawn by an end portion of the opening/closing body 2 in an opened state relative to a closed state of the opening/closing body 2.

Herein, the rotational speed, the rotation angle, and the rotational direction of the motor 14 correspond to the position, the speed, and the opening/closing direction of the opening/closing body 2 in one-to-one relation (in synchronization with each other), and hence, when the rotational speed, the rotation angle, and the rotational direction of the motor 14 are determined, the position, the speed, and the opening/closing direction of the opening/closing body 2 are determined. In addition, when a user manually performs an opening/closing action (an opening action or a closing action) for the opening/closing body 2, the motor 14 rotates in response to the opening/closing action, and hence the pulse signals are sent to the control device 20 from the pulse sensor 14a. Accordingly, the speed measurement portion 25 can measure the speed of the opening/closing body 2, the position measurement portion 26 can measure the position of the opening/closing body 2, and the direction determination portion 27 can determine the opening/closing direction of the opening/closing body 2, in the case where the user manually performs the opening/closing action for the opening/closing body 2.

The control device 20 further includes an operation control portion 28 as a functional portion that is implemented by the CPU 21 based on a prescribed program stored in the memory 22. The operation control portion 28 controls the drive circuit 23 connected to the motor 14, controls the rotational direction of the motor 14 by switching the polarity of a voltage applied to the motor 14, and controls the rotational speed of the motor 14 by changing ON/OFF (duty ratio) of the voltage (PWM control). Thus, the operation control portion 28 controls the speed and the opening/closing direction of the opening/closing body 2.

A main switch 30 is a switch that allows the user to determine whether the assist function for the opening/closing action for the opening/closing body 2 is used, and is provided in the vicinity of, e.g., the driver's seat of the vehicle 1. The main switch 30 sends an ON signal or an OFF signal to the control device 20 via the I/O circuit 29, and the control device 20 determines whether the assist function is to be activated based on the signal. Note that the assist function may also be activated constantly without using the main switch 30.

A sound generator 31 is controlled by the control device 20 via the I/O circuit 29, and generates a buzzer sound and a melody sound. When the control device 20 executes the assist function for the opening/closing action for the opening/closing body 2, the control device 20 controls the sound generator 31 and generates the buzzer sound and the melody sound to thereby inform the user of the execution of the assist function.

In the case where the user performs the opening/closing action for the opening/closing body 2, by using an increase of the speed of the opening/closing body 2 to a value equal to or higher than a prescribed speed (speed threshold) at the position as a trigger, the control device 20 according to the present embodiment electrically causes the opening/closing body 2 to perform the opening/closing operation to assist the opening/closing action for the opening/closing body 2 performed by the user.

Figure 3A:
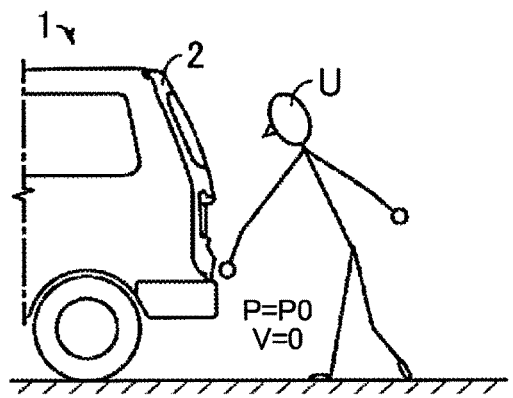
FIG. 3A is a view showing an outline of an assist function according to the first embodiment.
Figure 3B:
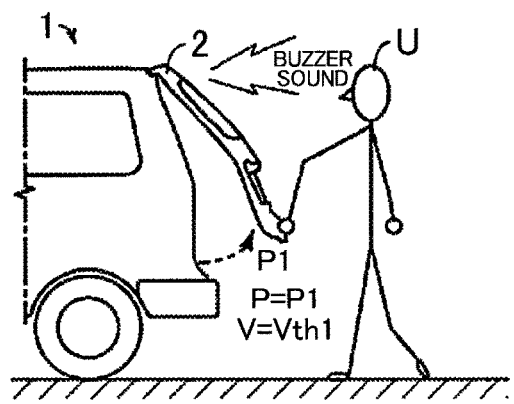
FIG. 3B is a view showing the outline of the assist function according to the first embodiment.
Figure 3C:
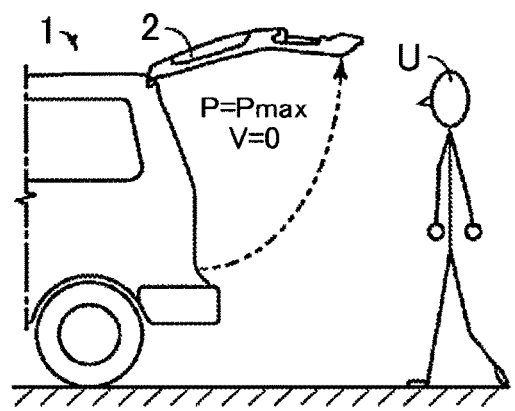
FIG. 3C is a view showing the outline of the assist function according to the first embodiment.

Each of FIGS. 3A, 3B, and 3C is a view showing an outline of the assist function for the opening action for the opening/closing body 2. Note that the same applies to the case of the closing action for the opening/closing body 2. First, as shown in FIG. 3A, a user U manually performs the opening action for the opening/closing body 2 in order to open the opening/closing body 2 in a fully closed state (position P0). Thereafter, as shown in FIG. 3B, it is assumed that when the opening/closing body 2 is at a position P1, a speed V of the opening/closing body 2 becomes equal to or higher than a speed threshold Vth1 at the position P1. At this time point, the control device 20 activates the assist function for the opening action for the opening/closing body 2, and as shown in FIG. 3C, controls the drive unit 10 to electrically cause the opening/closing body 2 to perform the opening operation until the opening/closing body 2 is brought to a fully opened state (position Pmax).

Figure 4A:
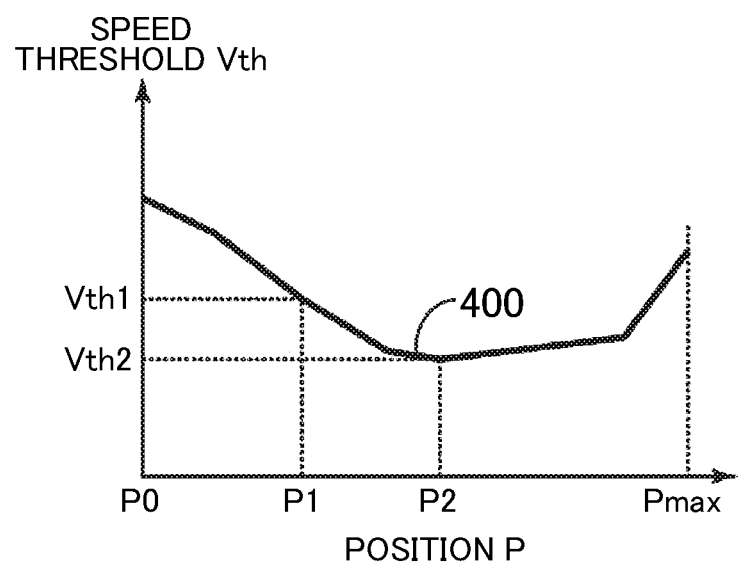
FIG. 4A is a conceptual diagram of a speed threshold map according to the first embodiment.
Figure 4B:
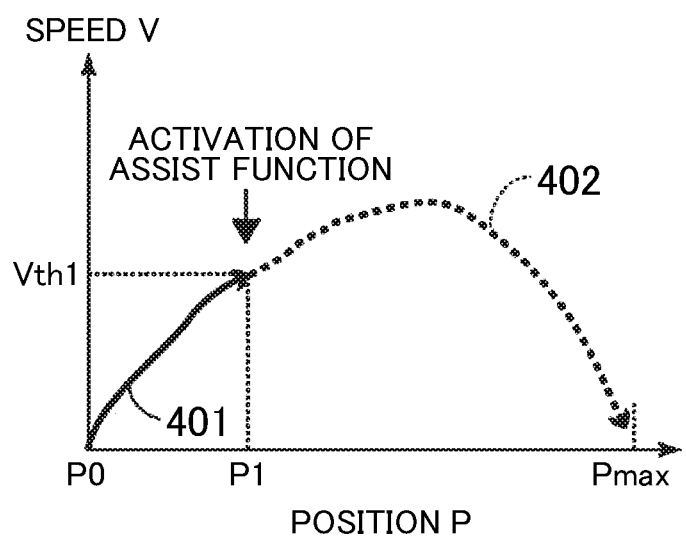
FIG. 4B is a diagram showing a relationship between a speed and a position of the opening/closing body in the first embodiment.

FIG. 4A is an example of a speed threshold map 400 indicative of a relationship between a speed threshold Vth used as the trigger for the activation of the assist function for the opening/closing action for the opening/closing body 2 performed by the user and the position P of the opening/closing body 2, and FIG. 4B shows examples of loci 401 and 402 indicative of a relationship between the speed V and the position P of the opening/closing body 2 related to the opening/closing action for the opening/closing body 2 performed by the user and the opening/closing operation of the opening/closing body 2 caused by the control device 20. Note that FIG. 4B shows the opening operation of the opening/closing body 2, and the same applies to the closing operation of the opening/closing body 2.

The speed threshold map 400 is a map indicative of the relationship between the position P of the opening/closing body 2 and the speed threshold Vth of the opening/closing body 2 used as the trigger for the activation of the assist function performed by the control device 20. For example, when the opening/closing body 2 is at the position P1, the speed threshold is Vth1 and, when the opening/closing body 2 is at a position P2 (>P1), the speed threshold is Vth2 (<Vth1). Thus, the speed threshold Vth is a value that changes according to the position P of the opening/closing body 2.

The speed threshold map 400 is created based on empirical trial and error such that the load of the user who performs the opening/closing action for the opening/closing body 2 is reduced as much as possible. In addition, the speed threshold map 400 in the case of the opening action for the opening/closing body 2 may be different from the speed threshold map 400 in the case of the closing action for the opening/closing body 2, and the speed threshold map 400 may differ from one type of the vehicle 1 to another type of the vehicle 1. In the present embodiment, the speed threshold map 400 is pre-stored in the memory 22, and the CPU 21 reads and uses the speed threshold map 400.

Figure 5A:
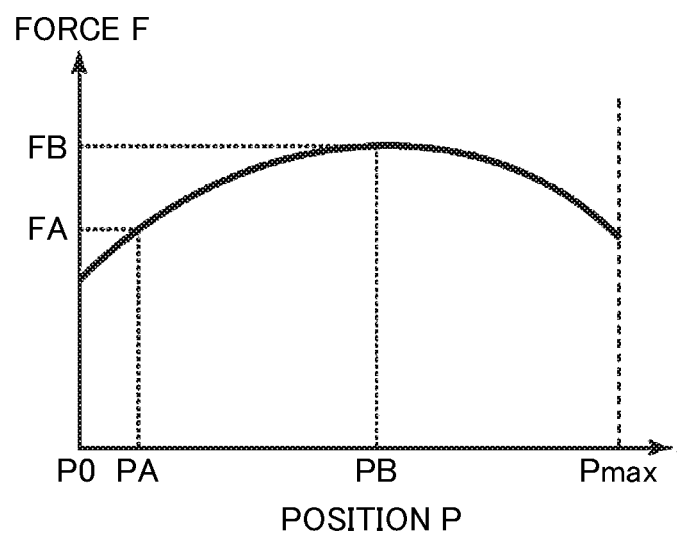
FIG. 5A is a diagram showing a relationship between a force required to move the opening/closing body and the position of the opening/closing body in the first embodiment.
Figure 5B:
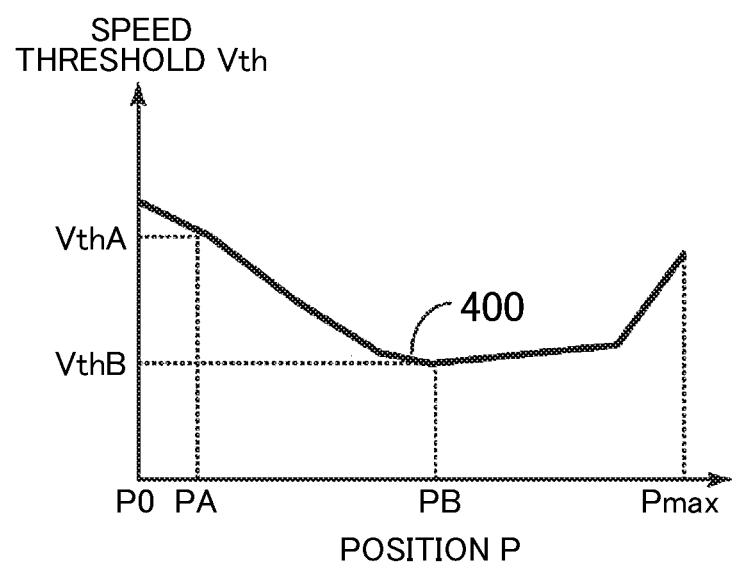
FIG. 5B a conceptual diagram of the speed threshold map according to the first embodiment.

Herein, an example of the creation of the speed threshold map 400 will be briefly described by using FIGS. 5A and 5B. FIG. 5A is a graph indicative of a relationship between a force F required to move the opening/closing body 2 and the position P of the opening/closing body 2 when the user manually performs the opening/closing action for the opening/closing body 2, and FIG. 5B is the speed threshold map 400 of FIG. 4A.

As shown in FIG. 5A, in the case where the user manually performs the opening/closing action for the opening/closing body 2, when the opening/closing body 2 is in the vicinity of the fully closed state (position P0) and when the opening/closing body 2 is in the fully opened state (position Pmax), the force F required for the user to move the opening/closing body 2 is relatively small (i.e., the opening/closing body 2 is relatively light), and when the opening/closing body 2 is in the vicinity of a half-opened state, a relatively large force F is required (i.e., the opening/closing body 2 is relatively heavy). Accordingly, by setting the tendency of the speed threshold Vth to a tendency symmetrical with the tendency of the force F that the user needs to apply to the opening/closing body 2 with respect to a line, the force F applied by the user for the activation of the assist operation can be made substantially constant irrespective of the position P of the opening/closing body 2. In other words, by using the speed threshold map 400 described above, the action amount (herein, power=force F×speed threshold Vth, although not limited thereto) of the user for the activation of the assist operation performed by the control device 20 can be made constant irrespective of the position P of the opening/closing body 2, and the load of the user is reduced as a result.

For example, as shown in FIG. 5A, when the opening/closing body 2 is at a position PA, the force F that the user needs to apply to the opening/closing body 2 is FA, and when the opening/closing body 2 is at a position PB (>PA), the force F is FB (>FA). Accordingly, in the case where the force F (>FA) with which the speed V of the opening/closing body 2 becomes equal to or higher than the speed threshold Vth is applied to the opening/closing body 2 at the position PA and the assist operation is activated, a speed threshold VthB is set to be smaller than VthA such that the speed V of the opening/closing body 2 becomes equal to or higher than the speed threshold VthB even when the force F similar to the above force F is applied to the opening/closing body 2 at the position PB. That is, in the case where the user performs the opening/closing action for the opening/closing body 2 to activate the assist operation performed by the control device 20, the assist operation is activated with the similar action amount irrespective of the position of the opening/closing body 2, and thus, the load of the user is reduced.

Returning to the description of FIGS. 4A and 4B, as indicated by the locus 401 of FIG. 4B, while the user performs the opening action for the opening/closing body 2 in the fully closed state such that the opening/closing body 2 is brought to the fully opened state, the control device 20 measures the position P and the speed V of the opening/closing body 2 at prescribed time intervals (e.g., on a millisecond order), refers to the speed threshold map 400 every time the measurement is performed, and determines whether the measured speed V of the opening/closing body 2 is equal to or higher than the speed threshold Vth at the measured position P of the opening/closing body 2 (i.e., the speed threshold Vth corresponding to the measured position P of the opening/closing body 2). Subsequently, when the opening/closing body 2 has moved to the position P1, the speed V of the opening/closing body 2 becomes equal to or higher than the speed threshold Vth1 at the position P1, and hence the control device 20 activates the assist function for the opening action for the opening/closing body 2 performed by the user, by using the increase of the speed V of the opening/closing body 2 to a value equal to or higher than the speed threshold Vth1 as the trigger. As indicated by the locus 402 of FIG. 4B, the control device 20 controls the drive unit 10, electrically causes the opening/closing body 2 to perform the opening operation, causes the opening/closing body 2 to perform the open operation until the opening/closing body 2 is brought to the fully opened state, and stops the opening operation of the opening/closing body 2. During this, the opening/closing body 2 performs the opening operation automatically, and hence the user does not need to perform the opening action for the opening/closing body 2.

Figure 6:
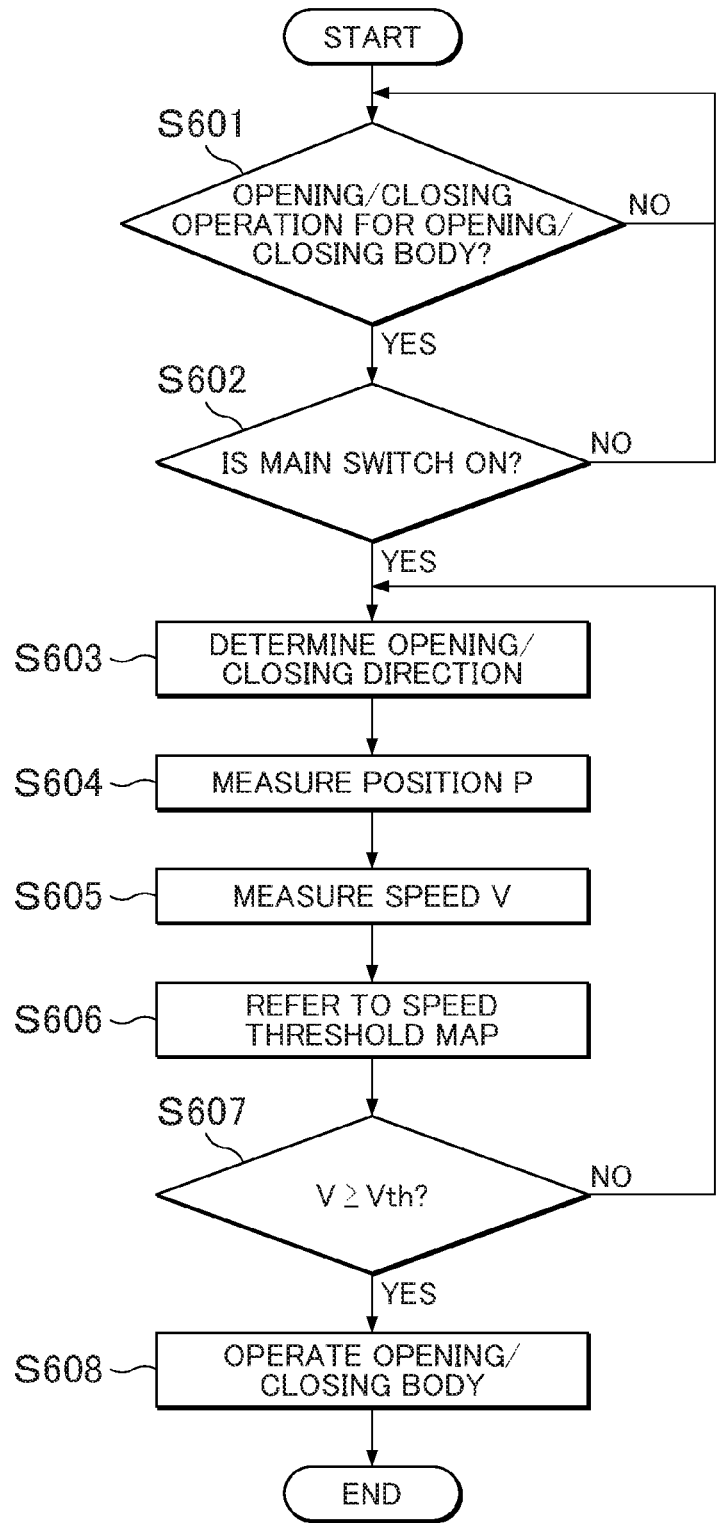
FIG. 6 is a flowchart of an activation process for the assist function according to the first embodiment.

FIG. 6 is a flowchart related to an activation process for the assist function performed by the control device 20 according to the present embodiment.

In step S601, the control device 20 determines whether the opening/closing action for the opening/closing body 2 has been performed by the user, and the control device 20 moves the process to S602 in the case where the control device 20 determines that the opening/closing action has been performed, and repeats monitoring of the opening/closing action in S601 at prescribed time intervals (e.g., on a millisecond order) in the case where the control device 20 determines that the opening/closing action is not performed. When the opening/closing action for the opening/closing body 2 is performed, the pulse signals are sent to the control device 20 from the pulse sensor 14a. When the speed measurement portion 25 measures a speed exceeding a prescribed speed (e.g., 0) based on the pulse signal, the control device 20 can determine whether the opening/closing action for the opening/closing body 2 by the user has been performed. In addition, the control device 20 may also determine whether the opening/closing action for the opening/closing body 2 has been performed by the user, by receiving a signal indicating that the opening/closing body 2 is opened or closed from a courtesy switch (not shown).

In step S602, the control device 20 determines whether the main switch 30 is ON based on a signal from the main switch 30, the control device 20 moves the process to S603 in the case where the main switch 30 is ON, and the control device 20 returns the process to S601 and does not perform the assist operation in deference to the intention of the user in the case where the main switch 30 is OFF.

In step S603, the direction determination portion 27 determines the opening/closing direction of the opening/closing body 2 based on the pulse signals from the pulse sensor 14a. In step S604, the position measurement portion 26 measures the position P of the opening/closing body 2 based on the pulse signal from the pulse sensor 14a. In step S605, the speed measurement portion 25 measures the speed V of the opening/closing body 2 based on the pulse signal from pulse sensor 14a. In step S606, the operation control portion 28 refers to the speed threshold map 400 stored in the memory 22, and reads the speed threshold Vth at the position P measured in S604 (i.e., the speed threshold Vth corresponding to the position P measured in S604).

In step S607, the operation control portion 28 determines whether the speed V of the opening/closing body 2 measured in S605 is equal to or higher than the speed threshold Vth read in S606, and moves the process to S608 in the case where the speed V is equal to or higher than the speed threshold Vth. In the case where the speed V is less than the speed threshold Vth (No in S607), the operation control portion 28 moves the process to S603, and the control device 20 continues monitoring of the opening/closing direction, the position P, and the speed V of the opening/closing body 2. Note that, in the case where a determination of Yes is not made in S607 before the opening/closing action for the opening/closing body 2 performed by the user is ended, the flow ends without activating the assist function.

In step S608, the operation control portion 28 controls the drive circuit 23 to control the rotation and the rotational direction of the motor 14, and the operation control portion 28 thereby causes the opening/closing body 2 to perform the opening operation or the closing operation in the opening/closing direction determined in S603. At this time point, the control device 20 may control the sound generator 31 to generate the buzzer sound or the melody sound from the sound generator 31 and inform the user that the opening/closing operation of the opening/closing body 2 is electrically performed.

As described thus far, the control device 20 according to the present embodiment implements the assist function for the opening/closing action for the opening/closing body 2 performed by the user. In the related art, the movement of the opening/closing body of the vehicle to a prescribed position is used as the trigger for the activation of the assist function, and hence, in the case where the opening/closing body has moved to the prescribed position irrespective of the intention of the user, the related art has a problem that the opening/closing body malfunctions automatically. However, in the present embodiment, since the trigger for the activation of the assist function performed by the control device 20 is the increase of the speed V of the opening/closing body 2 to the value equal to or higher than the speed threshold Vth that changes according to the position P of the opening/closing body 2, the possibility of occurrence of the above malfunction is reduced.

In addition, in the related art, whichever position the opening/closing body is at, the user needs to move the opening/closing body to the prescribed position in order to activate the assist function, and for example, in the case where the opening/closing body is positioned far away from the prescribed position, a problem arises in that the action amount required for the user to activate the assist function becomes relatively large, and the load of the user is increased. However, in the present embodiment, the speed threshold map related to the trigger for the activation of the assist function for the opening/closing action for the opening/closing body 2 performed by the user is set such that the action amount required for the user to activate the assist function is substantially constant irrespective of the position P of the opening/closing body 2, and as a result, the load of the user related to the activation of the assist function is reduced.

When the speed of the opening/closing body 2 at a position is equal to or higher than the speed threshold at the position (i.e., the speed threshold corresponding to the position) while the user manually performs the opening/closing action for the opening/closing body 2 (i.e., while the user manually operates the opening/closing body 2), the control device 20 operates, with the use of the drive unit 10, the opening/closing body 2 in the opening/closing direction in which the opening/closing body 2 is operated by the user, so as to assist the opening/closing action performed by the user. Accordingly, the possibility of the malfunction is reduced as compared to the related art in which only the position of the opening/closing body 2 is used as the trigger for the activation of the assist function.

The control device 20 for the vehicle opening/closing body according to a second embodiment of the invention will be described. The configuration of the control device 20 and the like according to the present embodiment is the same as that in the first embodiment, and hence the description thereof will be omitted. In the present embodiment, the position measurement portion 26 is configured to measure a movement amount M of the opening/closing body 2 from a first position of the opening/closing body 2 to a second position thereof, in addition to the position P of the opening/closing body 2. Note that the movement amount M may be calculated using a difference between the second position and the first position, and may also be calculated by using other known algorithms.

The control device 20 according to the present embodiment uses a movement amount threshold map described later in order to activate the assist function for the opening/closing body 2 in addition to the above-described speed threshold map. Thus, the action amount (herein, a work load or energy, although not limited thereto) required for the user to activate the assist function can be made substantially constant irrespective of the position P of the opening/closing body 2.

Figure 7A:
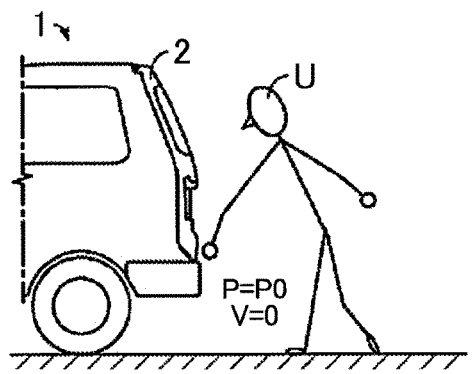
FIG. 7A is a view showing an outline of an assist function according to a second embodiment.
Figure 7B:
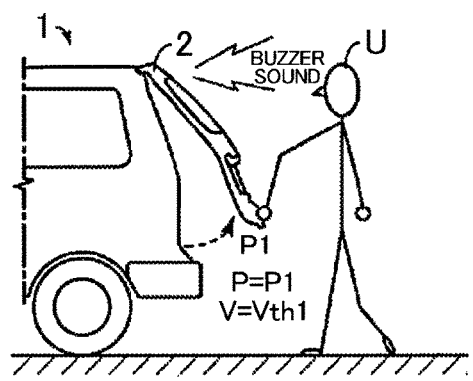
FIG. 7B is a view showing the outline of the assist function according to the second embodiment.
Figure 7C:
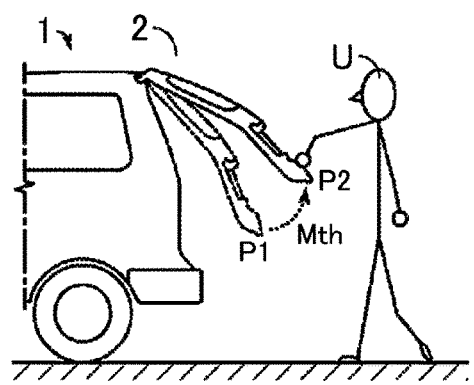
FIG. 7C is a view showing the outline of the assist function according to the second embodiment.

Each of FIGS. 7A, 7B, and 7C is a view showing the outline of the assist function according to the present embodiment. Note that the outline of the assist function for the opening action for the opening/closing body 2 will be described in each of FIGS. 7A, 7B, and 7C, and the same applies to the closing action.

First, as shown in FIG. 7A, the user U starts the opening action for the opening/closing body 2 in the fully closed state (position P0). As shown in FIG. 7B, it is assumed that when the opening/closing body 2 is at the position P1, the speed V of the opening/closing body 2 becomes equal to or higher than the speed threshold Vth1 at the position P1. Thereafter, the position measurement portion 26 of the control device 20 starts the measurement of the movement amount M from the position P1 of the opening/closing body 2 to the position P of the opening/closing body 2 at a measurement time point. Subsequently, as shown in FIG. 7C, at a time point when the opening/closing body 2 has moved to the position P2 and the movement amount M becomes equal to or larger than a movement amount threshold Mth at the position P1 of the opening/closing body 2 at the measurement start time point when measurement of the movement amount M starts, the control device 20 activates the assist function, controls the drive unit 10, and causes the opening/closing body 2 to perform the opening operation until the opening/closing body 2 is brought to the fully opened state (position Pmax).

Figure 8A:
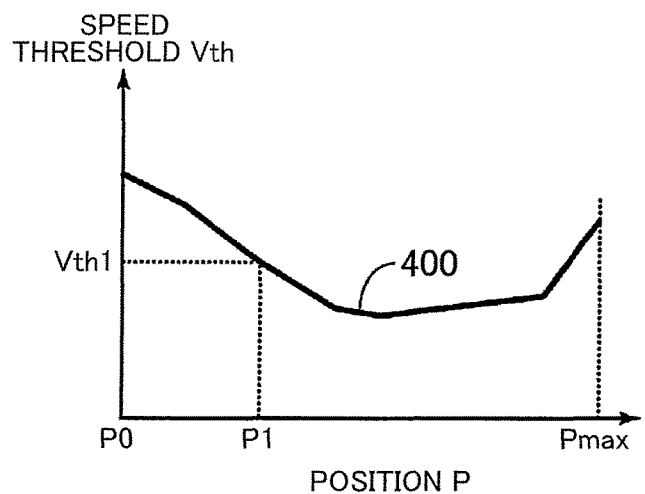
FIG. 8A is a conceptual diagram of a speed threshold map according to the second embodiment.
Figure 8B:
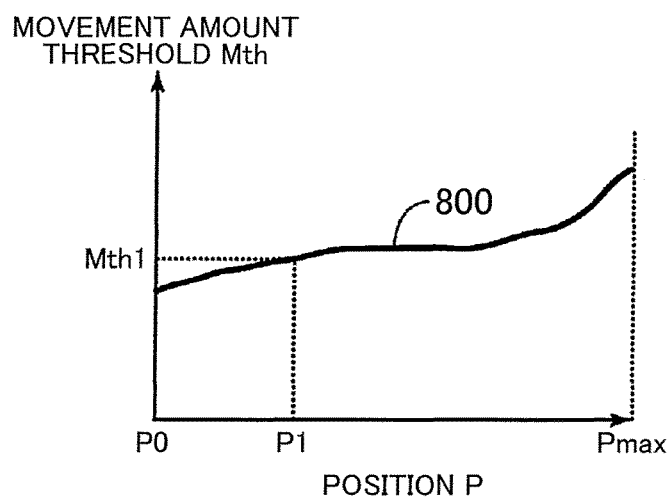
FIG. 8B is a conceptual diagram of a movement amount threshold map according to the second embodiment.
Figure 8C:
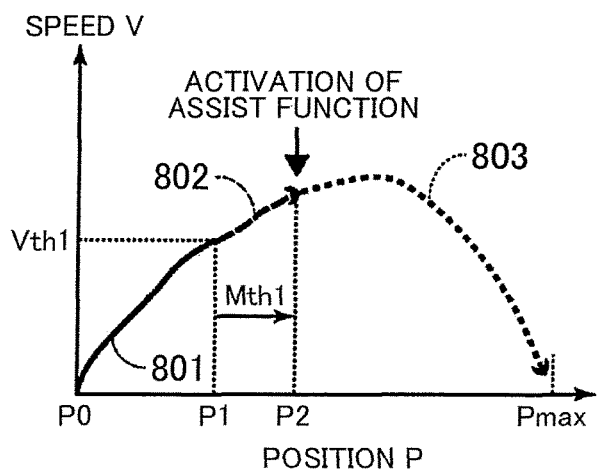
FIG. 8C is a diagram showing a relationship between a speed and a position of an opening/closing body in the second embodiment.

FIG. 8A is an example of the speed threshold map 400 indicative of the relationship between the speed threshold Vth used as a first trigger for the activation of the assist function and the position P of the opening/closing body 2, and FIG. 8B is an example of a movement amount threshold map 800 indicative of a relationship between the movement amount threshold Mth used as a second trigger for the activation of the assist function and the position P of the opening/closing body 2. In addition, FIG. 8C shows examples of loci 801 to 803 indicative of a relationship between the speed V and the position P of the opening/closing body 2 in the opening action for the opening/closing body 2 performed by the user. Note that the speed threshold map 400 is the same as that in the first embodiment, and hence the description thereof will be omitted.

The movement amount threshold map 800 is a map indicative of a relationship between the position P of the opening/closing body 2 at the time point when the first trigger based on the speed threshold Vth occurs and the movement amount threshold Mth as the second trigger indicative of the movement amount of the opening/closing body 2 required to activate the assist function. At a time point when the speed V of the opening/closing body 2 at the first position P1 becomes equal to or higher than the speed threshold Vth at the first position P1 (occurrence of the first trigger), the control device 20 starts the measurement of the movement amount M of the opening/closing body 2. At a time point when the movement amount M becomes equal to or larger than the movement amount threshold Mth at the first position P1 (occurrence of the second trigger), the control device 20 activates the assist function, controls the drive unit 10, and starts the opening/closing operation of the opening/closing body 2.

Figure 9A:
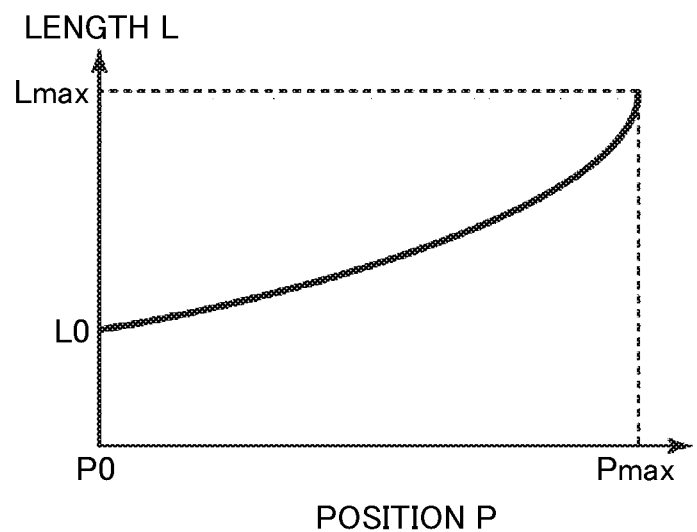
FIG. 9A is a diagram showing a relationship between a length of a drive unit and the position of the opening/closing body in the second embodiment.
Figure 9B:
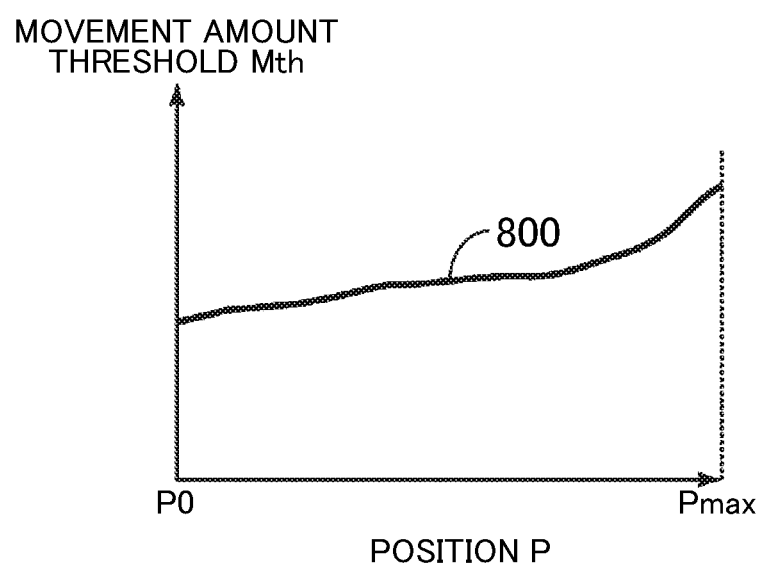
FIG. 9B is a conceptual diagram of the movement amount threshold map according to the second embodiment.

Herein, an example of the creation of the movement amount threshold map 800 will be briefly described by using FIGS. 9A and 9B. FIG. 9A is an example of a graph indicative of a relationship between a length L of the drive unit 10 and the position P of the opening/closing body 2, while FIG. 9B is the movement amount threshold map 800 of FIG. 8B.

In the present embodiment, the opening/closing body 2 is configured to be opened and closed by extending and contracting the drive unit 10, and the length L of the drive unit 10 changes non-linearly according to the position P of the opening/closing body 2. That is, an extension rate of the length L of the drive unit 10 with respect to an unit movement amount of the opening/closing body 2 when the opening/closing body 2 is at a position at which the opening/closing body 2 is relatively closed (P0 side) is smaller than the extension rate thereof when the opening/closing body 2 is at a position at which the opening/closing body 2 is relatively opened (Pmax side). Accordingly, in the case where the user performs the opening/closing action for the opening/closing body 2 with the same action amount, the movement amount of the opening/closing body 2 is relatively small when the opening/closing body 2 is at the position at which the opening/closing body 2 is relatively closed, and the movement amount of the opening/closing body 2 is relatively large when the opening/closing body 2 is at the position at which the opening/closing body 2 is relatively opened. Therefore, the tendency of the movement amount threshold map 800 is set to be similar to the tendency of the length L of the drive unit 10 such that the action amount of the user for the activation of the assist function is constant irrespective of the position of the opening/closing body 2.

Returning to the description of FIGS. 8A, 8B, and 8C, as indicated by the locus 801 of FIG. 8C, while the user performs the opening action for the opening/closing body 2 in the fully closed state such that the opening/closing body 2 is brought to the fully opened state, the control device 20 measures the position P and the speed V of the opening/closing body 2 at prescribed time intervals (e.g., on a millisecond order), refers to the speed threshold map 400 every time the measurement is performed, and determines whether the measured speed V of the opening/closing body 2 is equal to or higher than the speed threshold Vth at the measured position P of the opening/closing body 2. Subsequently, at a time point when the opening/closing body 2 has moved to the position P1 and the speed V of the opening/closing body 2 becomes equal to or higher than the speed threshold Vth1 at the position P1 (occurrence of the first trigger), the control device 20 refers to the movement amount threshold map 800, and reads a movement amount threshold Mth1 at the position P1. Subsequently, the control device 20 measures the movement amount M of the opening/closing body 2 from the position P1, and at a time point when the movement amount M becomes equal to or larger than the movement amount threshold Mth1 (occurrence of the second trigger), the control device 20 activates the assist function, and controls the drive unit 10 to cause the opening/closing body 2 to perform the opening/closing operation.

Figure 10:
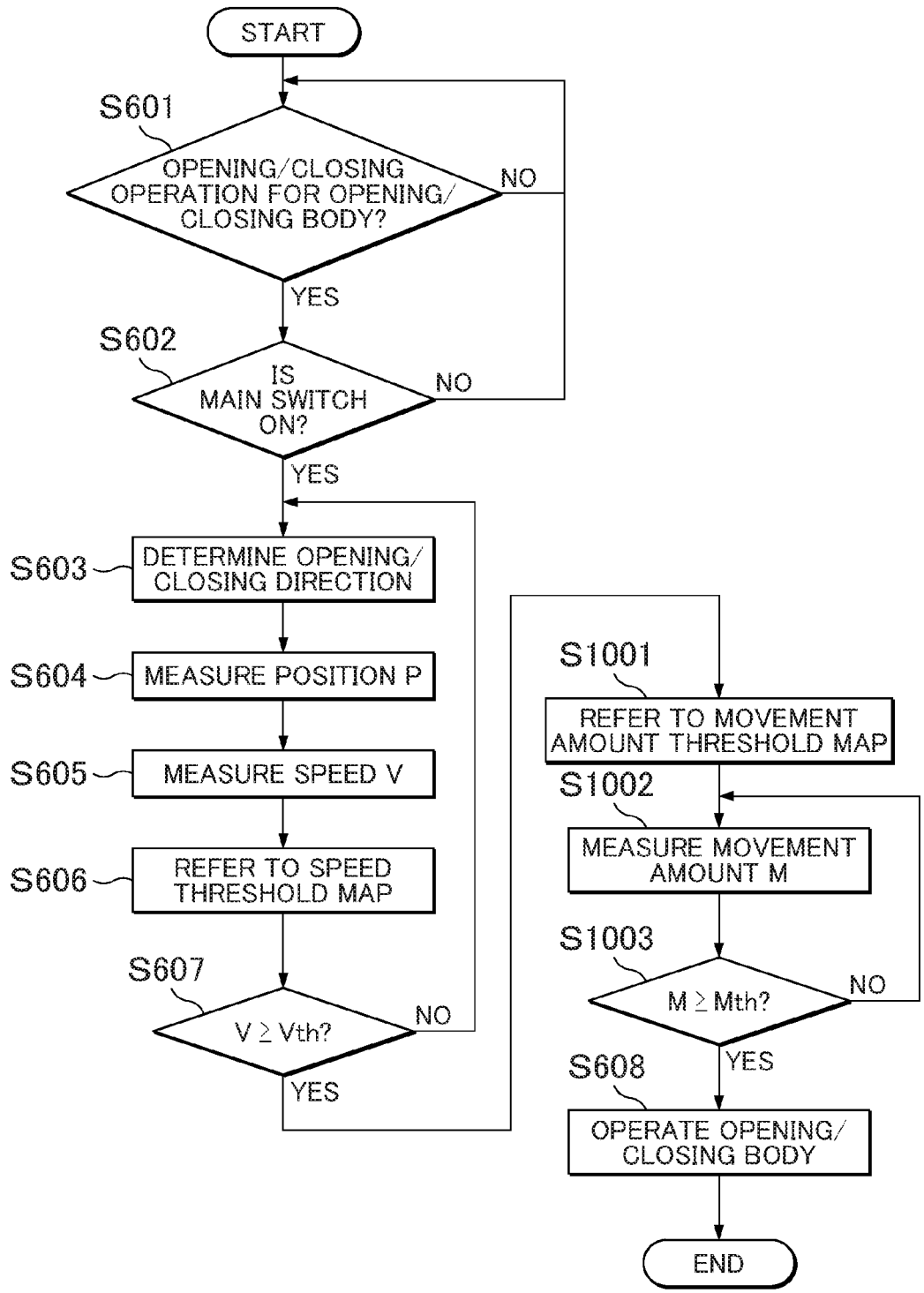
FIG. 10 is a flowchart of an activation process for the assist function according to the second embodiment.

FIG. 10 is a flowchart related to the activation process for the assist function performed by the control device 20 according to the present embodiment. Note that steps S601 to S608 are the same as those in the first embodiment, and hence the description thereof will be omitted.

In step S1001, the operation control portion 28 refers to the movement amount threshold map 800 stored in the memory 22, and reads the movement amount threshold Mth corresponding to the position P of the opening/closing body 2 at the time point when the speed V of the opening/closing body 2 becomes equal to or higher than the speed threshold Vth in S607. In the example shown in FIGS. 8A, 8B, and 8C, the speed of the opening/closing body 2 becomes equal to or higher than the speed threshold Vth1 at the position P1, and hence the operation control portion 28 reads the movement amount threshold Mth1 at the position P1 from the movement amount threshold map 800.

In step S1002, the position measurement portion 26 measures the position P of the opening/closing body 2 based on the signal from the pulse sensor 14a, and measures the movement amount M from the position of the opening/closing body at the time point when the speed V of the opening/closing body 2 becomes equal to or higher than the speed threshold Vth in S607.

In step S1003, the operation control portion 28 determines whether the movement amount M of the opening/closing body 2 measured in S1002 is equal to or larger than the movement amount threshold Mth read in S1001, and moves the process to S608 in the case where the movement amount M is equal to or larger than the movement amount threshold Mth. In the case where the movement amount M is less than the movement amount threshold Mth (No in S1003), the operation control portion 28 moves the process to S1002, and the position measurement portion 26 continues the measurement of the movement amount M of the opening/closing body 2. Note that, in the case where a determination of Yes is not made in S1003 before the opening/closing action for the opening/closing body 2 performed by the user is ended, the flow ends without activating the assist function.

As described above, the control device 20 according to the present embodiment implements the assist function for the manual opening/closing action for the opening/closing body 2 performed by the user. In the present embodiment, the trigger for the activation of the assist function performed by the control device 20 includes the fact that the speed V of the opening/closing body 2 is equal to or higher than the speed threshold Vth that changes according to the position P of the opening/closing body 2 (the first trigger), and the fact that the movement amount M of the opening/closing body 2 from a time point when the speed V becomes equal to or higher than the speed threshold Vth is equal to or larger than the movement amount threshold Mth corresponding to the position P at the time point (the second trigger). Thus, in the present embodiment, since two types of the triggers are used for the activation of the assist operation for the opening/closing action for the opening/closing body 2 performed by the user, as an additional effect, it is possible to separate the movement of the opening/closing body 2 by a disturbance and the movement of the opening/closing body 2 by the opening/closing action of the user, from each other. Herein, the disturbance denotes an influence of gravity acting on the opening/closing body 2 in the case where the vehicle 1 is positioned on a slope and an influence of wind power acting on the opening/closing body 2. In addition, by using the speed threshold Vth and the movement amount threshold Mth that change according to the position P of the opening/closing body 2, the action amount of the user for the activation of the assist function can be made constant irrespective of the position P of the opening/closing body 2, and thus, it is possible to reduce the load of the user related to the activation of the assist function.

Figure 11:
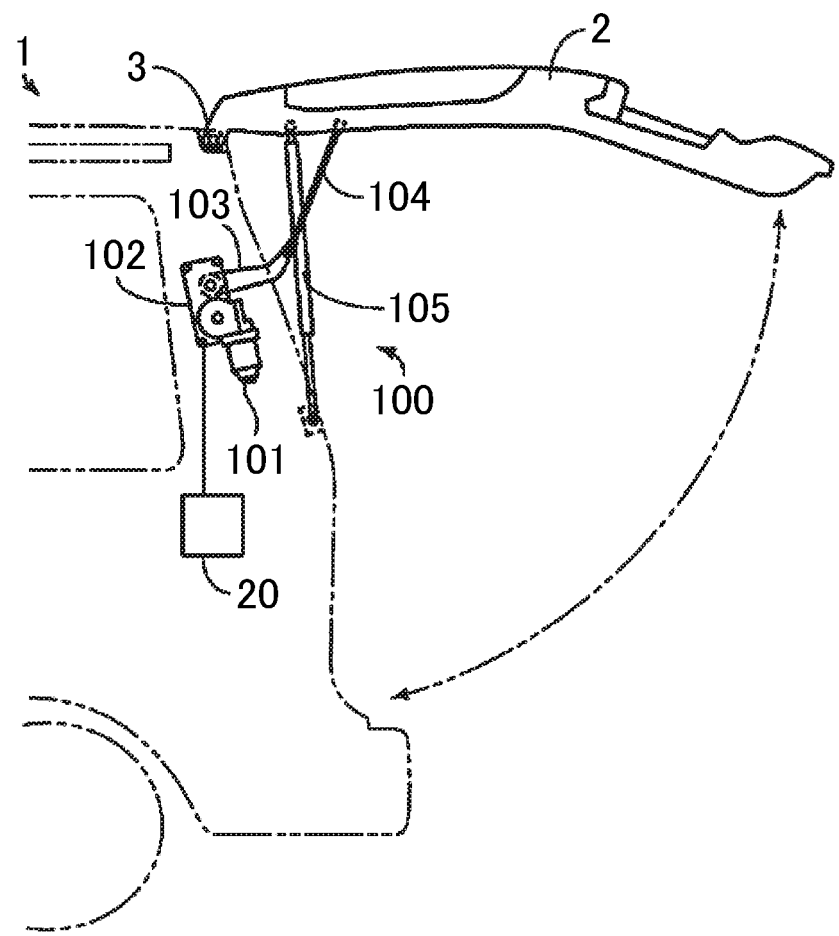
FIG. 11 is a schematic configuration diagram of a drive unit according to another embodiment.

In the invention, the opening/closing body 2 is not limited to the back door, and the invention can also be similarly applied to a slide door or a swing door. In addition, the drive unit 10 is not limited to the drive unit having the configuration shown in FIG. 1B, and may also be a drive unit 100 having a configuration shown in FIG. 11. The drive unit 100 includes a motor 101, a reduction mechanism 102, an operation arm 103, an operation rod 104, and a gas damper 105. The control device 20 controls the application, interruption, and direction of a current flowing in the motor 101 by controlling the drive circuit 23. Thus, the control device 20 controls the rotation of the motor 101. After the rotation of the motor 101 is reduced by the reduction mechanism 102, the rotation of the motor 101 moves the operation arm 103 to cause the opening/closing body 2 to perform the opening/closing operation via the operation rod 104 having one end rotatably coupled to the operation arm 103 and the other end rotatably coupled to the opening/closing body 2. The gas damper 105 has one end mounted to the vehicle body of the vehicle 1 and the other end mounted to the opening/closing body 2, and urges the opening/closing body 2 in the opening direction using a gas reaction force. In addition, in each of the first and second embodiments, the control device 20 measures the speed V of the opening/closing body 2 based on the pulse signal from the pulse sensor 14a, but an optical sensor that directly measures the speed of the opening/closing body 2 may be provided, or the speed may also be calculated by providing an acceleration sensor that measures the acceleration of the opening/closing body 2 and performing an integration process. Further, the position P may be measured by using a distance sensor that measures a distance to the opening/closing body 2, or the position P of the opening/closing body 2 may also be calculated by performing the integration process on the speed V.

What is claimed is:

1. A control device for a body of a vehicle, said body being mounted on the vehicle to rotate about a substantially horizontal axis in an opening direction and a closing direction, comprising
an electronic control unit configured to measure a position of the body of the vehicle, measure a speed of the body, and when the body is not operated by a drive unit, determine if a user is moving the body in the opening direction or the closing direction, and activate an assist operation to move the body in the determined opening direction or closing direction with use of the drive unit when the measured speed of the body, as moved by the user, at the measured position of the body is equal to or higher than a speed threshold at the measured position of the body, wherein the speed threshold is set such that a force applied to the body by the user when the assist operation is activated is substantially constant irrespective of the position of the body.

2. The control device according to claim 1, wherein the electronic control unit is configured to further measure a movement amount of the body, and activate the assist operation to move the body in the determined opening direction or closing direction with the use of the drive unit when the measured speed of the body, as moved by the user, at the measured position of the body is equal to or higher than the speed threshold at the measured position of the body, and the movement amount of the body from the measured position of the body is equal to or larger than a movement amount threshold.

3. The control device according to claim 2, wherein the movement amount threshold changes according to the position of the body.

4. The control device according to claim 3, wherein the movement amount threshold increases as the body moves in the opening direction.

5. The control device according to claim 1, wherein the speed threshold changes according to the position of the body.

6. A control device for a body of a vehicle, the body being mounted on the vehicle to rotate about a substantially horizontal axis in both an opening direction and a closing direction, the control device comprising:
　an electronic control unit configured to measure a position of the body of the vehicle, measure a speed of the body, and when the body is not operated by a drive unit, determine if a user is moving the body in the opening direction or the closing direction, and activate an assist operation to move the body in the determined opening direction or closing direction with use of the drive unit when the measured speed of the body, as moved by the user, at the measured position of the body is equal to or higher than a speed threshold at the measured position of the body, the speed threshold being set such that a force applied to the body by the user when the assist operation is activated is substantially constant irrespective of the position of the body,
　wherein the speed threshold varies as the position of the body changes as the body moves in the opening direction or the closing direction.

7. The control device according to claim 6, wherein the electronic control unit is configured to further measure a movement amount of the body, and activate the assist operation to move the body in the determined opening direction or closing direction with the use of the drive unit when the measured speed of the body, as moved by the user, at the measured position of the body is equal to or higher than the speed threshold at the measured position of the body, and the movement amount of the body from the measured position of the body is equal to or larger than a movement amount threshold.

8. The control device according to claim 7, wherein the movement amount threshold changes according to the position of the body.

9. The control device according to claim 8, wherein the movement amount threshold increases as the body moves in the opening direction.

10. A control device for a body of a vehicle, the body being mounted on the vehicle to rotate about a substantially horizontal axis in an opening direction and in a closing direction, the control device comprising:
　an electronic control unit which measures a position of the body while the body is moving to determine a measured position of the body, measures a speed of the body while the body is moving, and when the body is not operated by a motor, determines if a user is moving the body in the opening direction or the closing direction, and activates an assist operation to move the body in the determined opening direction or closing direction through operation of the motor when the measured speed of the body, as moved by the user, at the measured position of the body is equal to or higher than a speed threshold at the measured position of the body; and
　a memory that stores a speed threshold map identifying the speed threshold for different positions of the body so that a force applied to the body by the user when the assist operation is activated is substantially constant irrespective of the position of the body.

11. The control device according to claim 10, wherein the electronic control unit is configured to further measure a movement amount of the body, and activate the assist operation to move the body in the determined opening direction or closing direction through operation of the motor when the measured speed of the body, as moved by the user, at the measured position of the body is equal to or higher than the speed threshold at the measured position of the body, and the movement amount of the body from the measured position of the body is equal to or larger than a movement amount threshold.

12. The control device according to claim 11, wherein the movement amount threshold changes according to the position of the body.

13. The control device according to claim 12, wherein the movement amount threshold increases as the body moves in the opening direction.

* * * * *